Oct. 8, 1940.  L. SCRIBA  2,217,564
COMBINED AIR-SPEED INDICATOR AND RATE-OF-CLIMB INDICATOR
Filed July 19, 1938  3 Sheets-Sheet 1

Inventor:
Ludwig Scriba

Oct. 8, 1940.  L. SCRIBA  2,217,564
COMBINED AIR-SPEED INDICATOR AND RATE-OF-CLIMB INDICATOR
Filed July 19, 1938   3 Sheets-Sheet 2

Inventor:
Ludwig Scriba

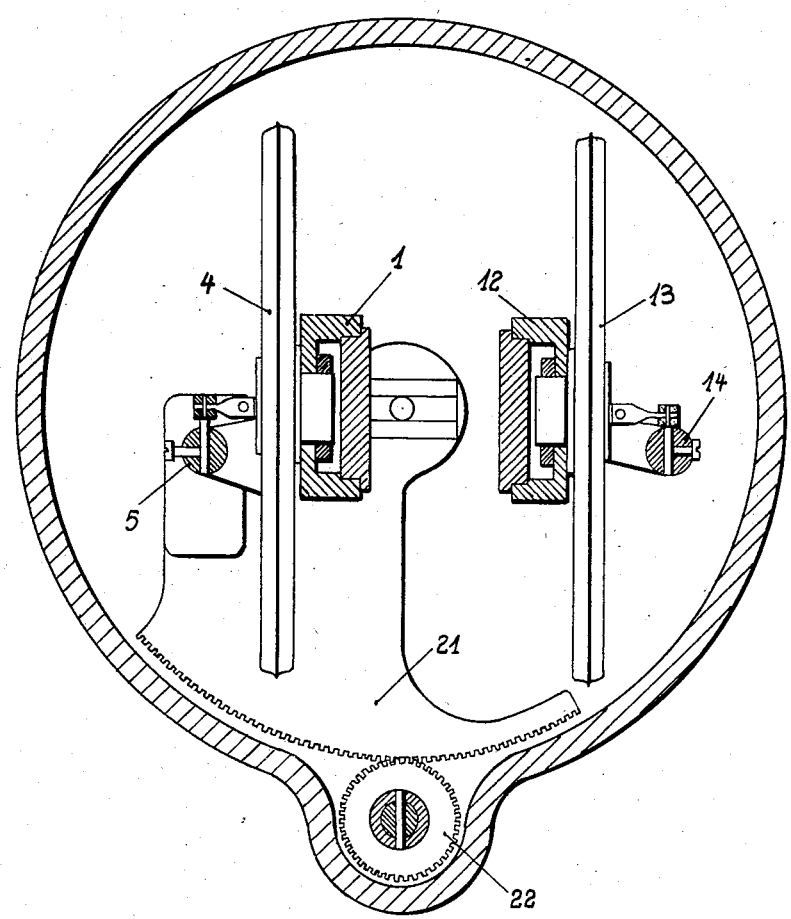

Patented Oct. 8, 1940

2,217,564

UNITED STATES PATENT OFFICE 2,217,564

COMBINED AIR-SPEED INDICATOR AND RATE-OF-CLIMB INDICATOR

Ludwig Scriba, Berlin-Friedenau, Germany, assignor to Askania-Werke A. G., a corporation of Germany Application July 19, 1938, Serial No. 220,155
In Germany July 23, 1937

5 Claims. (Cl. 73—2)

This invention relates to improvements in or relating to an instrument to be used in aircraft.

It is an object of the invention to provide an instrument for aircraft in which is combined in one casing an air-speed indicator and a rate-of-climb indicator.

A further essential object of the invention is to provide in a device of the nature set forth a speed indicator to be rotatable about the axis of the speed pointer.

Further objects and advantages of the invention will now be more fully explained with reference to the following specification and the accompanying drawings, wherein:

Fig. 3 is a vertical, transverse sectional view.

It is a well known experience to those skilled in the art that one can control in the simplest manner the existing attitude and conditions of flight by means of the relation of the indications of the air-speed indicator and the rate-of-climb indicator of an aircraft. Thus the pilot can draw conclusions out of the relation of horizontal to vertical speed regarding the tendency of the aircraft, the motor load and the like. Therefore, one had arranged up to now the air-speed and the rate-of-climb indicator next to one another on the instrument board and in order to emphasize especially their relationship one connected thereby the two pointer axes with one another by means of a broad line.

The invention has taken count of the need for the best visible expression of the relationship of the two indications in that both measuring systems are united in one casing and the two pointer axes are laid directly next to one another. A further essential improvement in case of this combined arrangement consists therein that the entire measuring system of the air-speed indicator including its dial is turnable around its pointer axis. In this manner is achieved that the pointer of the air-speed indicator can be turned at every flying speed until it is in a horizontal position. As after reaching the normal traveling altitude of flight the rate-of-climb-indicator pointer indicates zero, thus being horizontal, both pointers form during travelling speed a broad, continuous line.

Figure 1:
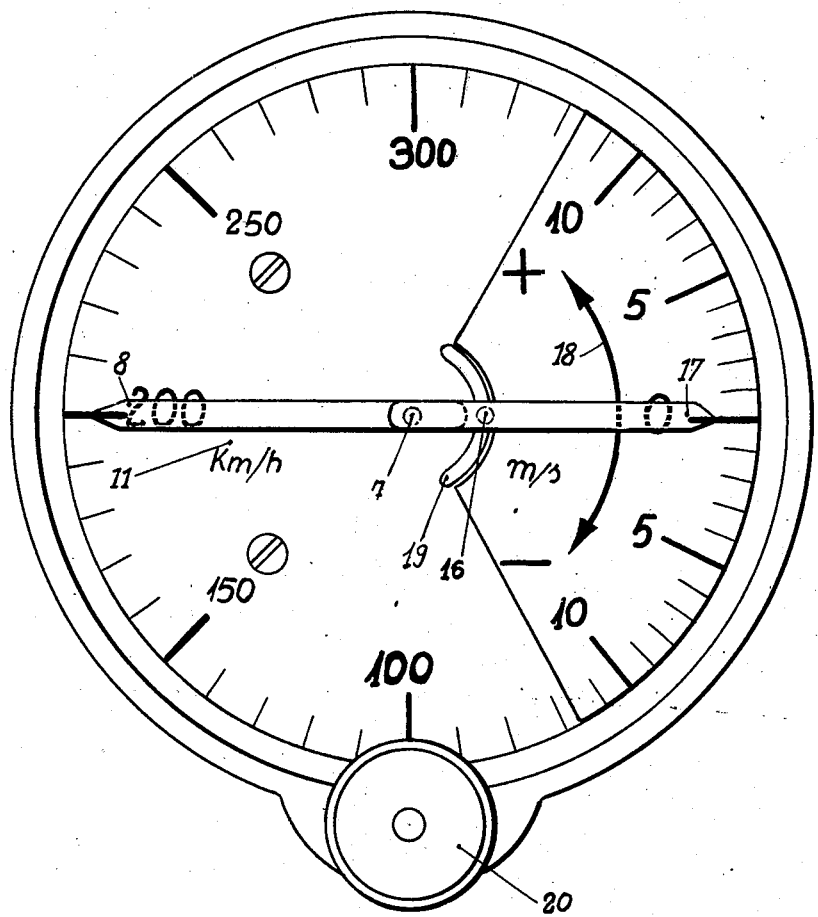
Fig. 1 is a face view of an instrument embodying the invention.

Fig. 1 shows the front view of the new combined instrument. 18 is the fixed dial of the rate-of-climb indicator, which forms a sector of about 120° and is in front of the dial 11 of the air-speed indicator. In the illustrated position the pointer 8 of the air-speed indicator is turned so as to form a horizontal line with the pointer 17 of the rate-of-climb indicator. The adjusting or turning of the air-speed indicator may be effected by any suitable means such as a knob 20, actuating suitable gears.

The horizontal position of the two pointers is the normal position, as during horizontal flight the pointer of the rate-of-climb indicator already indicates zero. The pilot needs only observe the horizontal line formed by the pointers in order to convince himself with one glance of the uniformity of the flight with respect to speed and altitude.

During constant motor performance, as soon as the flight path inclines downwardly, the speed of the aircraft and the pressure on the diaphragm box of the rate-of-climb indicator increase, resulting in that both pointers are moved in the same sense, i. e., towards the right. On the other hand if during the climbing of the aircraft its speed and the pressure on the diaphragm box of the rate-of-climb indicator decrease, then the two pointers move towards the left. The pilot can immediately inform himself with one glance of the existing tendency of his aircraft from the size and position of the angle formed by the two pointers.

When the aircraft lands, a decreasing of the travelling speed takes place, as well as an increasing of the speed of descent, whereby both pointers move downwardly, turning opposite to one another. On the other hand when the aircraft climbs, the two pointers move upwards.

Therefore, through the cooperation of the pointers of the two measuring instruments according to the invention, an especial visibility of the indications of the travelling and vertical speed, being closely connected and important for the flight condition, is achieved.

When executing the basic principle according to the invention, there are special constructive needs to be fulfilled. It is probably already well known, how to turnably arrange the measuring system of a single instrument for use in aircraft. But with respect to the invention the case differs in that it is necessary to place the pointer axes of two measuring systems close to one another and to leave furthermore for the one measuring system sufficient freedom of movement in order to be able to still execute a turn of about 100°–150° around the pointer axis.

Figure 2:
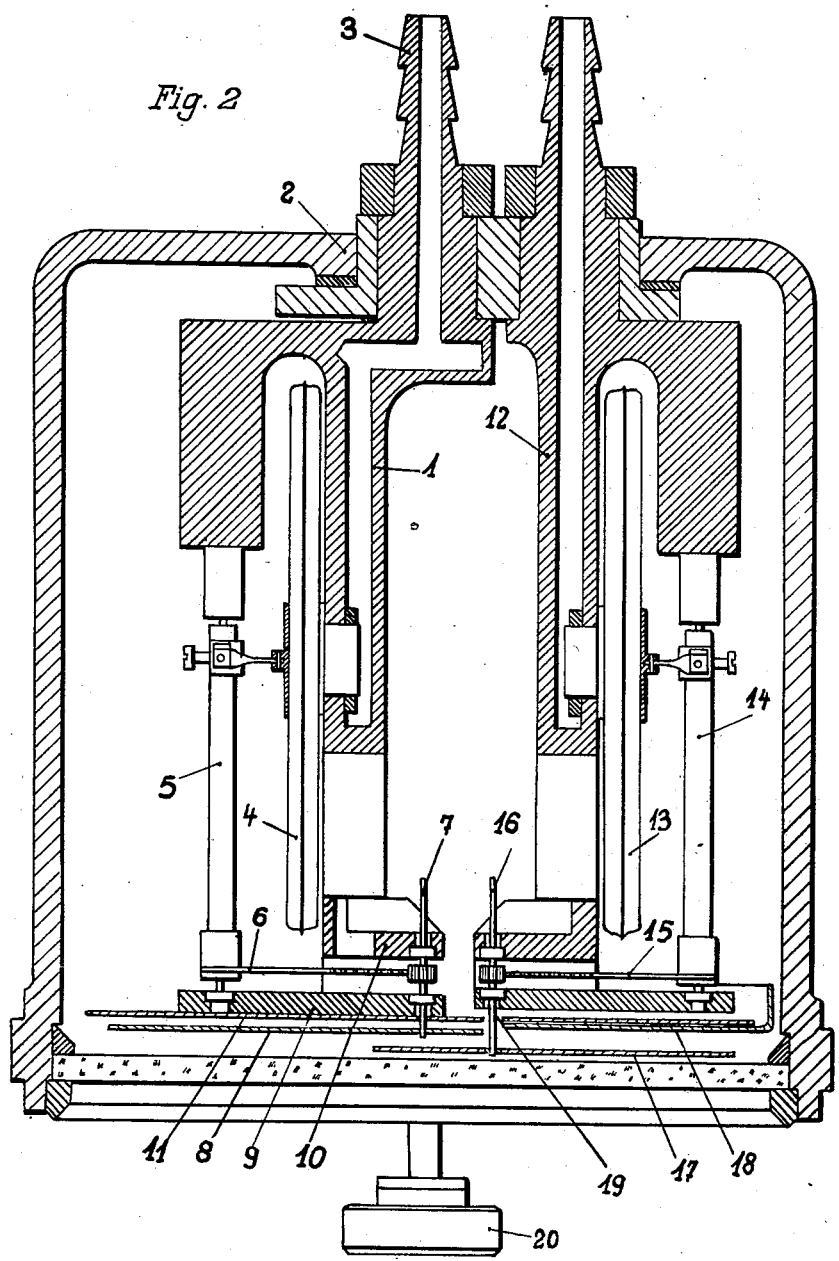
Fig. 2 is a horizontal sectional view of the instrument shown in Fig. 1.

Fig. 2 shows a longitudinal section of an especially practical embodiment for the arrangement of the two measuring systems. The measuring system of the air-speed indicator is at the support 1, which is turnably mounted to the back wall 2 of the casing. The turning axis lies in the longitudinal axis of the casing and is constructed at the same time as connection 3 for the dynamic pressure. Inside of the support there are borings which conduct the dynamic pressure up to the measuring box 4, which is arranged with its connecting tube in the boring ending at the support 1 parallel to the axis of the casing and, therefore, also parallel to the pointer axis. The diagram movement of the measuring box is transmitted over the axis 5 and the toothed sector 6 on the axis 7 of the pointer 8. The axis 7 is mounted in the supports 9, 10. These are fixedly connected with the support 1, with which they form a continuous construction part. Furthermore, the dial plate 11 of the air-speed indicator is connected with 9. The support 12 for the measuring system of the rate-of-climb indicator is fixedly screwed in next to the support 1 eccentrical to the casing axis. The measuring box 13 of the rate-of-climb indicator, as well as the transmitting members 14, 15 are arranged in the same manner as the air-speed indicator. The pointer axis 16 with the pointer 17 lies next to the pointer axis 7 of the air-speed indicator. 18 is the sector-like dial plate of the rate-of-climb indicator. The dial plate of the air-speed indicator has a half-circle like slit 19, in order to let the pointer axis of the rate-of-climb indicator pass through also when turning the air-speed indicator. The compressed construction is essentially achieved in that both measuring boxes, as well as the measuring system axes 5, 14 lie parallel to the longitudinal axis of the casing.

Fig. 3 shows a cross section of the arrangement. The supporting part 1 of the air-speed indicator possesses a toothed sector 21, which can be turned by an adjusting knob 20 over a gear wheel 22. The entire system of the air-speed indicator can execute a turn of about 100°–120° around its pointer axis before it touches the system of the rate-of-climb indicator.

Obviously many modifications of the subject of the invention are possible without departing from the spirit of the invention as defined in the appended claims.

What is claimed:

1. An instrument for use in aircraft comprising, in combination, a single casing having a rear wall; a first support extending through the rear wall of the casing and mounted on the longitudinal axis of the casing for rotatable adjustment; manual means to rotate said support; a first pointer having a shaft coaxial with the axis of rotation of said support; a diaphragm carried by said support; a conduit in said support connected to conduct dynamic pressure fluid to operate the diaphragm responsive to air-speed; means connecting the diaphragm to operate the pointer; a dial having air-speed graduations cooperating with said pointer; a second support connected to the rear wall of the casing adjacent to and substantially parallel with said first support and having a pressure fluid conduit; a diaphragm operated pointer having a shaft carried by said second support and operable in response to rate-of-climb and having a limited range of indicating movement substantially opposite from the first pointer; and a sector-like dial in front of the plane of the first dial having rate-of-climb graduations, said rate-of-climb pointer shaft being parallel to the air-speed pointer shaft and when the rate-of-climb pointer registers "zero" its longitudinal axis passes through the two pointer shafts.

2. A combination instrument for aircraft comprising, in combination, a substantially cylindrical casing; a diaphragm operated air-speed indicator having its pointer axis coinciding with the longitudinal axis of the casing; a rotatably adjustable support for said indicator carrying an air-speed indicating dial; a diaphragm operated rate-of-climb indicator having its pointer axis adjacent to and parallel with the axis of said air-speed pointer; said air-speed dial having an opening through which the spindle for the rate-of-climb pointer extends to permit adjustments of said air-speed dial; and a separate sector-shaped dial cooperating with said rate-of-climb pointer, said pointer axes being parallel to each other and when the rate-of-climb pointer registers "zero" its longitudinal axis passes through the two pointer shafts.

3. An instrument of the type set forth in claim 1, wherein the manual means for rotating the first support comprises a toothed sector carried by said support; and a knob outside the casing carrying a gear meshing with said toothed sector.

4. An indicating instrument for aircraft consisting of a casing containing an air-speed indicator and a rate-of-climb indicator, each indicator comprising a pointer having a shaft and a dial for each pointer of which the air-speed dial and its pointer are adjustable as a unit, said shafts being parallel to each other and when the rate-of-climb pointer registers "zero" its longitudinal axis passes through the two pointer shafts and is substantially horizontal, and means for adjusting the air-speed unit so that the air-speed pointer will indicate the cruising speed at a substantially horizontal position of the air-speed pointer to align both pointers on a substantially horizontal line at the cruising speed.

5. An indicating instrument for aircraft comprising a speedometer and a rate-of-climb indicator arranged in a common cylindrical casing, each indicator comprising a pointer, the pivot axes of the pointers being parallel and spaced from each other by an amount which is smaller than the diameter of the casing, said speedometer being arranged to be rotated around its pointer axis whereby the pointer of the speedometer and the pointer of the rate-of-climb indicator may be set so as to be aligned horizontally across the face of the instrument for level flight at a desired horizontal cruising speed.

LUDWIG SCRIBA.